United States Patent
Kitamura

(10) Patent No.: US 7,130,971 B2
(45) Date of Patent: Oct. 31, 2006

(54) ASSURING GENUINENESS OF DATA STORED ON A STORAGE DEVICE

(75) Inventor: Manabu Kitamura, Cupertino, CA (US)

(73) Assignee: Hitachi, Ltd., Tokyo (JP)

( * ) Notice: Subject to any disclaimer, the term of this patent is extended or adjusted under 35 U.S.C. 154(b) by 50 days.

(21) Appl. No.: 10/814,706

(22) Filed: Mar. 30, 2004

(65) Prior Publication Data

US 2005/0223164 A1    Oct. 6, 2005

(51) Int. Cl.
G06F 12/00 (2006.01)

(52) U.S. Cl. .............................. 711/154; 711/170

(58) Field of Classification Search ................ 711/114, 711/154–170; 360/92; 707/200–202; 719/310; 710/74; 709/212–224; 714/20
See application file for complete search history.

(56) References Cited

U.S. PATENT DOCUMENTS

| | | | |
|---|---|---|---|
| 4,733,349 A * | 3/1988 | Sumiyoshi et al. ......... 711/159 |
| 5,287,501 A | 2/1994 | Lomet |
| 5,416,914 A * | 5/1995 | Korngiebel et al. ........ 711/114 |
| 5,469,562 A * | 11/1995 | Saether ........................ 714/20 |
| 5,511,177 A | 4/1996 | Kagimasa et al. |
| 5,546,536 A | 8/1996 | Davis et al. |
| 5,713,013 A | 1/1998 | Black |
| 5,758,050 A | 5/1998 | Brady et al. |
| 5,794,244 A * | 8/1998 | Brosch et al. .............. 707/100 |
| 5,870,732 A * | 2/1999 | Fisher et al. .................... 707/1 |
| 5,919,258 A | 7/1999 | Kayashima et al. |
| 5,930,358 A | 7/1999 | Rao |
| 6,018,746 A * | 1/2000 | Hill et al. .................... 707/202 |
| 6,061,692 A | 5/2000 | Thomas et al. |
| 6,065,018 A * | 5/2000 | Beier et al. ................. 707/202 |
| 6,067,541 A * | 5/2000 | Raju et al. ...................... 707/3 |
| 6,101,508 A * | 8/2000 | Wolff .......................... 709/223 |
| 6,125,393 A | 9/2000 | Clark et al. |
| 6,131,147 A * | 10/2000 | Takagi ......................... 711/159 |
| 6,173,377 B1 | 1/2001 | Yanai et al. |
| 6,219,726 B1 | 4/2001 | Ripberger |
| 6,226,651 B1 * | 5/2001 | Masuda et al. ............. 707/202 |
| 6,226,688 B1 * | 5/2001 | Frary .......................... 719/310 |
| 6,236,626 B1 * | 5/2001 | Nagai ........................... 360/92 |
| 6,272,571 B1 * | 8/2001 | Bachmat ...................... 710/74 |
| 6,341,317 B1 | 1/2002 | D'Errico et al. |
| 6,343,324 B1 | 1/2002 | Hubis et al. |
| 6,502,165 B1 | 12/2002 | Kishi et al. |
| 6,526,417 B1 * | 2/2003 | Perry .......................... 707/202 |
| 6,553,387 B1 * | 4/2003 | Cabrera et al. ............. 707/200 |
| 6,732,124 B1 | 5/2004 | Koseki et al. |
| 6,732,125 B1 | 5/2004 | Autrey et al. |
| 6,820,119 B1 | 11/2004 | Omizo |
| 6,829,688 B1 | 12/2004 | Grubbs et al. |

(Continued)

OTHER PUBLICATIONS

U.S. Appl. No. 10/808,792, filed Mar. 24, 2004, Yagawa.

(Continued)

*Primary Examiner*—Pierre Bataille
*Assistant Examiner*—Paul Schlie
(74) *Attorney, Agent, or Firm*—Townsend and Townsend and Crew LLP

(57) ABSTRACT

Techniques to assure genuineness of data stored on a storage device are provided. The storage device includes a storage controller that conducts I/O operations and management operations. A description of management operations and corresponding timestamps are recorded to an operation log stored in a memory. The memory additionally stores an attribute for each storage volume of the storage device. Write access to each of the storage volumes is dependent on the attribute.

10 Claims, 8 Drawing Sheets

U.S. PATENT DOCUMENTS

| | | |
|---|---|---|
| 6,850,955 B1 | 2/2005 | Sonoda et al. |
| 2002/0032640 A1 | 3/2002 | LaFore et al. |
| 2002/0049823 A1* | 4/2002 | Tomita et al. ............... 709/212 |
| 2002/0069324 A1 | 6/2002 | Gerasimov et al. |
| 2002/0138502 A1 | 9/2002 | Gupta |
| 2003/0149762 A1* | 8/2003 | Knight et al. ............... 709/224 |
| 2003/0221077 A1 | 11/2003 | Ohno et al. |
| 2004/0111557 A1 | 6/2004 | Nakatani et al. |
| 2004/0148459 A1 | 7/2004 | Ali et al. |
| 2004/0186858 A1 | 9/2004 | McGovern et al. |
| 2004/0199566 A1 | 10/2004 | Carlson et al. |
| 2004/0260966 A1 | 12/2004 | Kaiya et al. |

OTHER PUBLICATIONS

"Log and Loggable Object Abstractions for Recovery Management," IBM Technical Disclosure Bulletin pp. 87-88 (Oct. 1995).

* cited by examiner

| VOL ID | START TIME | START LBA | LAST TIME | LAST LBA | FLAG |
|---|---|---|---|---|---|
| 1 | Jun. 1, 2000 12:00.02.000 | 0 | Jun. 1, 2000 12:10.32.984 | 0X00000E0A | ON |
| 2 | Jun. 4, 2000 09:32.00.382 | 0X00000100 | Jun. 4, 2000 11:04.25.004 | 0X00000122 | OFF |
| 3 | 0 | 0 | 0 | 0 | ON |
| ⋮ | ⋮ | ⋮ | ⋮ | ⋮ | ⋮ |
| N | Jun. 1, 2000 12:00.00.020 | 0X00000100 | Jun. 1, 2000 12:10.32.984 | 0X000003EA | ON |

FIG. 7

ASSURING GENUINENESS OF DATA STORED ON A STORAGE DEVICE

CROSS-REFERENCES TO RELATED APPLICATIONS

The present application incorporates by reference for all purposes the entire contents of U.S. application Ser. No. 10/807,857 filed on Mar. 23, 2004.

BACKGROUND OF THE INVENTION

The invention relates generally to the field of storage devices, and more particularly to techniques to assure the genuineness of data stored on storage devices.

An important aspect of today's business environment is compliance with new and evolving regulations for retention of information, specifically, the processes by which records are created, stored, accessed, managed, and retained over periods of time. Whether they are emails, patient records, or financial transactions, businesses are instituting policies, procedures, and systems to protect and prevent unauthorized access or destruction of these volumes of information. The need to archive critical business and operational content for prescribed retention periods, which can range from several years to forever, is defined under a number of compliance regulations set forth by governments or industries. These regulations have forced companies to quickly re-evaluate and transform their methods for data retention and storage management.

For example, in recent times, United States governmental regulations have increasingly mandated the preservation of records. United States government regulations on data protection now apply to health care, financial services, corporate accountability, life sciences, and the federal government. In the financial services industry, Rule 17a-4 of Securities Exchange Act of 1934, as amended, requires members of a national securities exchange, brokers, and dealer to retain certain records, such as account ledgers, itemized daily records of purchases and sales of securities, brokerage order instructions, customer notices, and other documents. Under this rule, members, brokers, and dealers are permitted to store such records in an electronic storage media if the preserved records are exclusively in a non-rewriteable, non-erasable format.

In addition, organizations and businesses can have their own document retention policies. These policies sometimes require retention of documents for long periods of time. The National Association of Securities Dealers ("NASD"), a self-regulatory organization relating to financial services, has such rules. For example, NASD Rule 3110 requires each of its members to preserve certain books, accounts, records, memoranda, and correspondence.

Preserved records can take many forms, including letters, patient records, memoranda, ledgers, spreadsheets, email messages, voice mails, instant messages. Accordingly, the volume of preserved records can be vast, requiring high transaction speeds and large capacities to process. In addition, preserved records may exist in many disparate electronic formats, such as PDF files, HTML documents, word processing documents, text files, rich text files, EXCEL™ spreadsheets, MPEG files, AVI files, or MP3 files.

A number of conventional methods currently use upper level software, or application software, to preserve data in a non-rewriteable, non-erasable format. For example, upper level software, such as electronic mail archiving software, can be tailored to prevent deletion of data. However, upper level software programs implementing write protection are generally perceived to be unreliable, vulnerable to security flaws, and easily bypassed at the storage medium level. Moreover, upper level software implementations can prove to be costly since such implementations will need to process many disparate forms of data originating from many sources.

In another conventional method, write once read many (WORM) storage devices are used to preserve data in a non-rewriteable, non-erasable format. However, it is difficult to prove that the contents of a WORM storage device remain preserved and unaltered over a specified period of time. For example, a user can keep business activities record in a rewriteable device, alter the contents as needed, and store the data into the WORM storage device prior to an audit. That is, even if the data is stored in the WORM storage device, it is not evident that the original data remains unaltered.

As can be appreciated, conventional techniques lack precautions necessary to instill confidence in the stored data by auditors, regulatory compliance officers, or inspectors. There is a need for improvements in storage devices, especially for techniques to archive data and increase the trustworthiness of such data.

BRIEF SUMMARY OF THE INVENTION

Embodiments of the present invention provide techniques to assure genuineness of data stored on a storage device. The storage device includes a storage controller that conducts I/O operations and management operations. A description of management operations and corresponding timestamps are recorded to an operation log stored in a memory. The memory additionally stores an attribute for each storage volume of the storage device. Write access to each of the storage volumes is dependent on the attribute.

According to an embodiment of the present invention, the storage system includes an interface to a host computer and a storage controller having a central processing unit that conducts an I/O operation and management operation. A description of management operation and corresponding timestamp are recorded to an operation log stored in a memory. The memory additionally stores an attribute for each storage volume of the storage system. Write access to each of the storage volumes is dependent on the attribute. Storage volumes are defined by at least one hard disk drive.

According to an alternative embodiment of the present invention, a storage system includes a first memory and second memory. The second memory stores an operation log to record a description of a management operation and a corresponding timestamp. A central processing unit extracts an instruction from the first memory and executes the instruction. A clock circuit provides time information that is used to generate the timestamp. Logical volumes of the storage system are stored on at least one hard disk drive. The system maintains an attribute for each of the logical volumes, and write access to each of the logical volumes is dependent on the attribute.

According to yet another alternative embodiment of the present invention, a method for assuring genuineness of data stored on a storage subsystem having a storage controller and a plurality of storage disks is provided. The method includes maintaining a first log and second log. Management operations of the storage subsystem and corresponding timestamps are recorded to the first log. Management operations of a logical volume and corresponding timestamps are recorded to the second log based on a write protect attribute and write protect period. Write access to the logical volume is precluded depending on the write protect attribute and write protect period. The first log, second log, or combination the first and second log can be outputted.

According to an embodiment of the present invention, a computer program product stored on a computer-readable storage medium for assuring genuineness of data maintained on a storage subsystem is provided. The computer program product includes code for maintaining a first log and second log; code for recording management operations of the storage subsystem and corresponding timestamps to the first log; code for identifying a write protect attribute and write protect period for a logical volume; code for recording management operations of the logical volume and corresponding timestamps to the second log depending on the write protect attribute and write protect period; code for denying write access to the logical volume to a host based on the write protect attribute and write protect period of the logical volume; and code for providing information from the first log, second log, or a combination of the first and second log to a console.

Other objects, features, and advantages of the present invention will become apparent upon consideration of the following detailed description and the accompanying drawings, in which like reference designations represent like features throughout the figures.

BRIEF DESCRIPTION OF THE DRAWINGS

FIG. 7 shows a system operation log according to an embodiment of the present invention.

DETAILED DESCRIPTION OF THE INVENTION

In the following description, specific details are set forth in order to merely illustrate the invention. However, it will be apparent that the invention may be practiced with certain modifications to the embodiments illustrated below.

Figure 1:
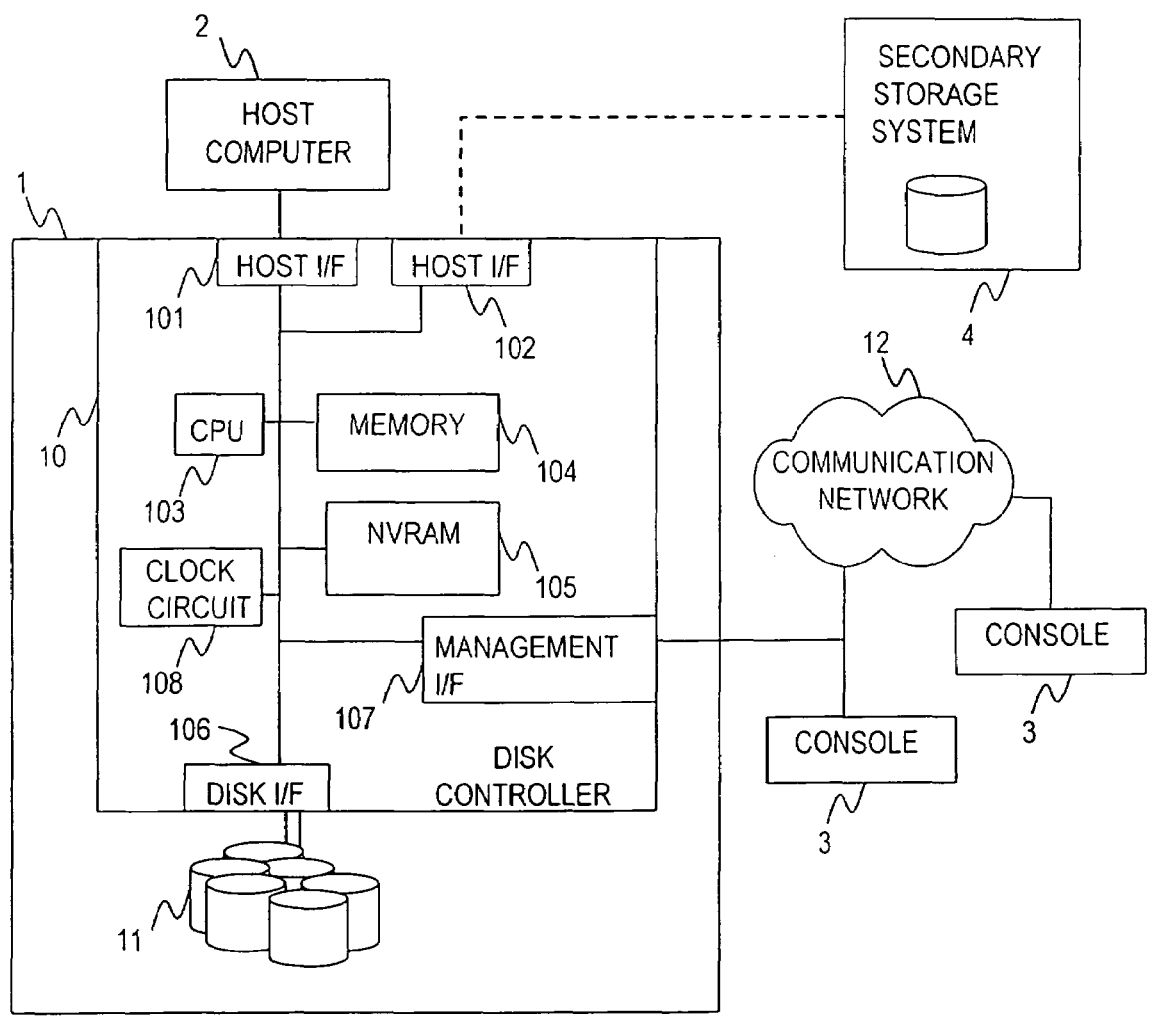
FIG. 1 illustrates a simplified system diagram of an exemplary primary storage system incorporating an embodiment of the present invention.

FIG. 1 illustrates a simplified system diagram of an exemplary primary storage system 1 incorporating an embodiment of the present invention. Primary storage system 1 is connected to a host computer 2, and a plurality of consoles 3. Primary storage system 1 may be connected to secondary storage system 4. Host computer 2 issues I/O request, such as read and write instructions, to primary storage system 1. The system configuration of primary storage system 1 can be accessed or changed by authorized users (e.g., systems administrator, auditor, compliance officer, inspector, or other like user) at consoles 3. Secondary storage system 4 can be used to copy or migrate data stored on primary storage system 1. For example, data stored in the logical volumes on primary storage system 1 can be migrated to logical volumes in the secondary storage system 4 if primary storage system 1 is to be replaced. In alternative embodiments, a plurality of host computers may be connected to primary storage system 1.

Storage system 1 (or storage subsystem) includes a disk controller 10 (or storage controller) and a plurality of disks 11. Disk controller 10 controls the operations of disks 11 to enable the communication of data to and from disks 11 to host computer 2. For example, disk controller 10 formats data to be written to disks 11 and verifies data read from disks 11. Disks 11 are one or more hard disk drives in the present embodiment. In other embodiments, disks 11 may be any suitable storage medium including floppy disks, CD-ROMs, CD-R/Ws, DVDs, magneto-optical disks, combinations thereof, and the like. Storage system 1 may include 1, 10, 100, 1,000, or more hard disk drives. In implementations of the present invention for a single personal computer, storage system will generally include fewer than 10 hard disk drives. However, for large entities, such as a leading financial management company, the number of hard disk drives can exceed 1,000. Each of disks 11 is installed in a shelf in storage system 1. Storage system 1 tracks the installed shelf location of each disk using identification information. The identification information can be a numerical identifier starting from zero, which is called HDD ID in the present embodiment. Furthermore, each disk has a unique serial number which can be tracked by storage system 1.

Disk controller 10 includes host interfaces 101 and 102, disk interface 106, and management interface 107 to interface with host computer 2, secondary storage system 4, disks 11, and consoles 3. Host interface 101 provides a link between host computer 2 and disk controller 10. It receives the read instructions, write instructions, and other I/O requests issued by host computer 2. Host interface 102 can be used to connect secondary storage system 4 to disk controller 10 for data migration. Alternatively, host interface 102 can be used to connect an additional host computer 2 to storage system 1. Disks 11 are connected to disk controller 10 through disk interface 106. Management interface 107 provides the interface to consoles 3.

In addition, disk controller 10 includes a central processing unit (CPU) 103, a memory 104, a non-volatile random access memory (NVRAM) 105, and a clock circuit 108. CPU 103 extracts instructions from memory 104 and executes them to run storage system 1. NVRAM 105 stores the operation log area 154 for storage system 1. NVRAM 105 may include one or more static random access memory (SRAM) devices connected to a constant power source, electrically erasable programmable read-only memory (EEPROM) devices, flash memory devices that save the contents of NVRAM 105 when power is turned off, or a combination thereof. Clock circuit 108 provides the timestamps (present date and time) used by the primary storage system 1.

As an embodiment of the present invention, to ensure the integrity of an operation log area 154 stored in NVRAM 105, consoles 3 or host computer 2 do not have direct access to NVRAM 105 or, alternatively, consoles 3 or host computer 2 do not have direct write access to NVRAM 105. CPU 103 enables write access to NVRAM 105 to store additional event to the operation log area 154. As a further alternative, CPU 103 can be restricted from rewriting over memory locations in NVRAM 105 used to store operation log area 154. CPU 103 can implement this restriction by maintaining one or more pointers to identify used or free memory locations in NVRAM 105. These access restrictions protect the operation log area 154 from tampering by any user (e.g., system administrators and compliance officers). Also, as a further alternative, operation log area 154 may be stored in a specific region of disks 11 where host computer 2 or consoles 3 cannot directly access.

For similar reasons, access can also be restricted to clock circuit 108 to prevent inaccurate timestamps from being recorded to operation log area 154. Techniques for providing clock management and adjustment in connection with content retention in a storage system are described in U.S. application Ser. No. 10/807,857 filed on Mar. 23, 2004.

Consoles 3 may be connected directly to storage system 1 or through a communication network 12. While in one embodiment, communication network 12 is a wide area network (WAN), in other embodiments, communication network 12 may be any suitable communication network including a local area network (LAN), the Internet, a wireless network, a intranet, a private network, a public network, a switched network, combinations thereof, and the like. Communication network 12 may include hardwire links, optical links, satellite or other wireless communications links, wave propagation links, or any other mechanisms for communication of information. Various communication protocols (such as TCP/IP, HTTP protocols, extensible markup language (XML), wireless application protocol (WAP), vendor-specific protocols, customized protocols, and others) may be used to facilitate communication between console 3 and storage system 1 via communication network 12. Communication network 12 can provide greater flexibility in managing and monitoring storage system 1. For example, a compliance officer at a corporate headquarters in New York City, N.Y. can remotely manage and monitor a storage system 1 located in a branch office in San Jose, Calif.

As yet another embodiment of the present invention, a plurality of host computers can be connected to storage system 1 through a communication network. This communication network can be similar to the communication network 12 used by consoles 3. Alternatively, it may be the same communication network. This feature would facilitate improved remote access to storage system 1. For example, storage system 1 may be located at a company's headquarters, while company's employees requiring access to stored information may be located at a branch office. The company's employees requiring access can do so remotely via a communication network.

Figure 2:
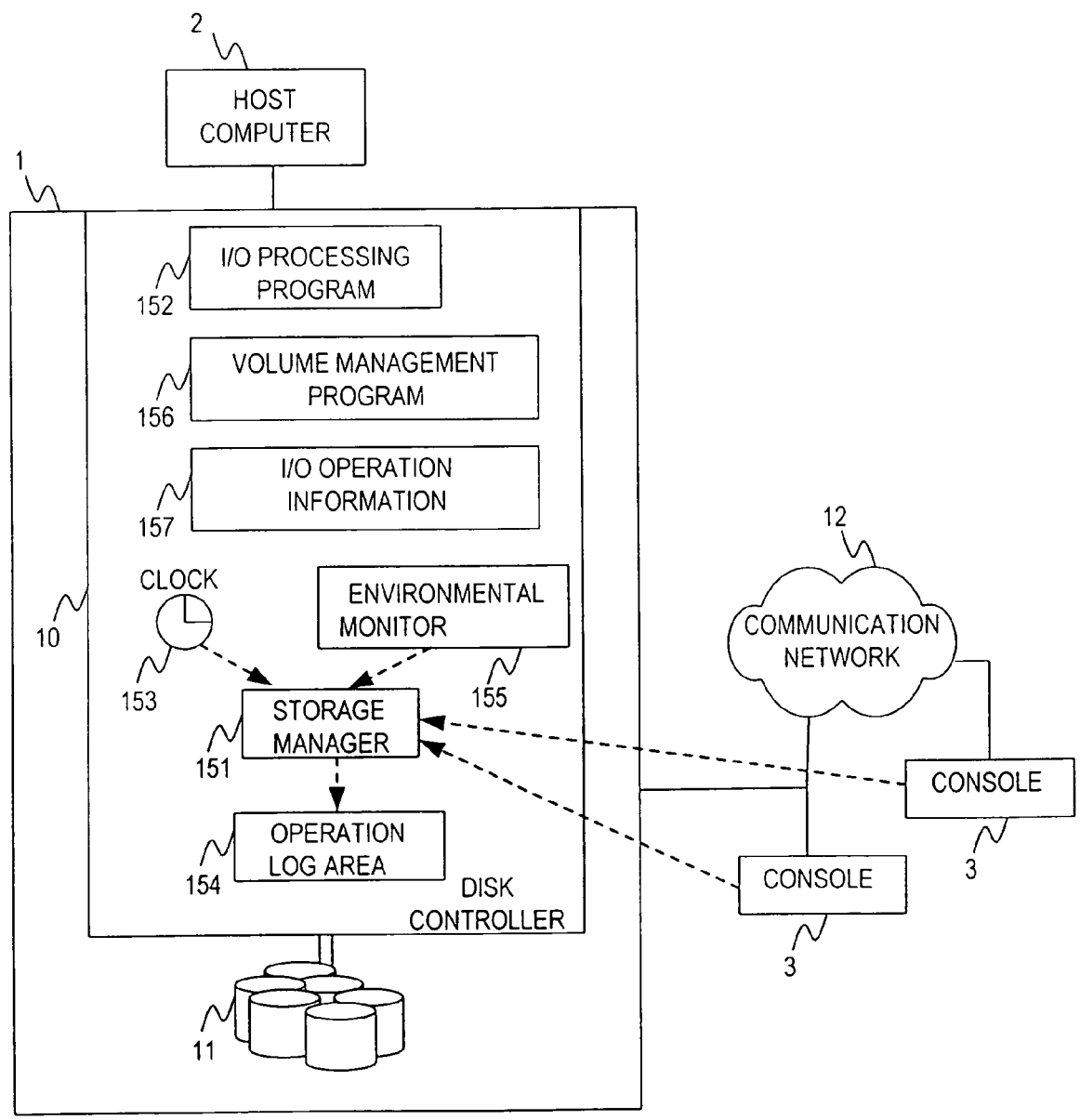
FIG. 2 shows a simplified functional block diagram of a storage system according to an embodiment of the present invention.

FIG. 2 shows a simplified functional block diagram of the disk controller 10 according to an embodiment of the present invention. Disk controller 10 includes one or more of the following functions: storage manager 151, I/O processing program 152, clock management program 153, environmental monitor 155, and volume management program 156. Storage manager 151, I/O processing program 152, clock management program 153, and volume management program 156 are the programs executed in CPU 103, and reside in memory 104.

I/O processing program 152 processes I/O requests from host computer 2 and accesses disks 11. One or more logical volumes (or storage volumes) from disks 11 are created by I/O processing program 152. In the present embodiment, each logical volume has its own unique volume identifier called a logical volume ID (VOL ID) so that I/O processing program 152 can distinguish between logical volumes. As an embodiment of the present invention, VOL ID can be equal to the logical unit number (LUN) which is a unique identifier used on a small computer system interface (SCSI), although any unique identifier can be used as VOL ID. Host computer 2 can issue I/O requests to gain access (e.g., read and, if not write protected, write access) to these logical volumes by specifying the LUN. I/O requests for a logical volume are converted by I/O processing program 152 to access the appropriate disk(s) of disks 11.

Volume management program 156 performs one or more of following functions:

1. Manage logical volume attributes. Each logical volume of storage system 1 has a volume attribute, which can be either "normal," "offline," or "write protected." The normal attribute indicates that the logical volume can accept both read and write operation from host computer 2. The offline attribute indicates that the logical volume cannot be read or written from host computer 2. A logical volume can be designated as offline by an authorized user via consoles 3. The authorized user may elect to do so to prevent all access to a logical volume. Also, storage system 1 may automatically designate a logical volume as offline if a failure occurs (e.g., failure of a hard disk drive underlying the logical volume). The write protected attribute indicates that the volume is write protected and cannot be written from host computer 2. The volume is write protected for a specified "retention period." After the attribute of the logical volume is changed to write protected, host computer 2 cannot write data to the logical volume, nor can anyone change the write protected attribute during the retention period. Once the retention period expires, users can change the attribute to normal, so that host computer 2 can write data to the logical volume. As an embodiment of the present invention, the retention period must be specified by a user when the write protected attribute is first set. Alternatively, the retention period can be set automatically to a default period. In addition, after the retention period has been set, as an alternative embodiment, an authorized user may increase the duration of the retention period, but not shorten it.

2. Create copy of a logical volume. Volume management program 156 includes functions to a copy data stored in a primary logical volume to a secondary logical volume within storage system 1. The secondary logical volume can be created for data restores, application testing and development, data mining, data warehousing, or non-disruptive backup, or as part of one's maintenance procedures. The copy logical volume function can be implemented by Hitachi ShadowImage Software, a product of Hitachi Data Systems Corporation. Details relating to Hitachi ShadowImage Software are disclosed in its data sheet, found at http://www.hds.com/pdf/shadowimage_datasheet_393_02.pdf, the entire disclosure of which is incorporated by reference to this patent.

3. Migrate a logical volume. Volume management program 156 includes functions to migrate the contents of a logical volume to secondary storage system 4, or to migrate the contents of a volume in the secondary storage system 4 to a logical volume in the storage system 1. Generally, the contents of logical volumes of the storage system are migrated to other storage locations prior to performing maintenance or replacing the storage system.

Storage manager 151 performs one or more of the following functions:

1. Process storage management operations. In response to requests from console 3, storage manager 151 controls the operations of the storage system. For example, a user can operate console 3 to change the configuration of the storage system 1, such as to create a logical volume, add a disk drive, copy a logical volume, or migrate a logical volume.
2. Collect state information. Storage manager 151 collects state information of the components of the storage system 1 using environmental monitor 155. For example, if one of disks 11 fails, environmental monitor 155 may detect the failure, identify the failed disk, and notify storage manager 151. As another example, if one or more disks of disks 11 are removed from the storage system 1, environmental monitor 155 may detect the removal and report relevant event information (e.g., HDD ID, unique serial number for disk, time, date, or other information) to the storage manager 151. Storage manager 151 stores this event information to the operation log area 154.
3. Collect volume management information. Storage manager 151 records event information relating to certain configuration changes of the logical volumes. The event information is stored in the operation log area 154 and can include, without limitation: date and time information, user identity, HDD ID, unique serial number for disk, nature of the configuration change. For example, if an authorized user on consoles 3 makes a request to copy a logical volume to another logical volume, storage manager 151 records the request to operation log area 154.
4. Report log information. Authorized users on console 3, such as system administrators, compliance officers, inspectors, can request and retrieve system and volume information stored in operation log area 154. Storage manager 151 can output the complete content of operation log area 154, or a portion thereof, to a console 3. The outputted information can be filtered and sorted prior to being displayed on console 3. For example, an authorized user can specify the logical volume ID of the log information to be retrieved, and storage manager 151 can output the log information relating to the specified volume. In alternative embodiments, outputted log information can be sorted or filtered by any data contained in operation log area 154 (e.g., time, date, HDD ID, write protect period, event, and others).

Clock management program 153 manages the time (i.e., current date and time) for storage system 1 and provides this time information to storage manager 151. When state or management information is stored to the operation log area 154, storage manager 151 also stores corresponding time information (i.e., a timestamp).

Figure 3:
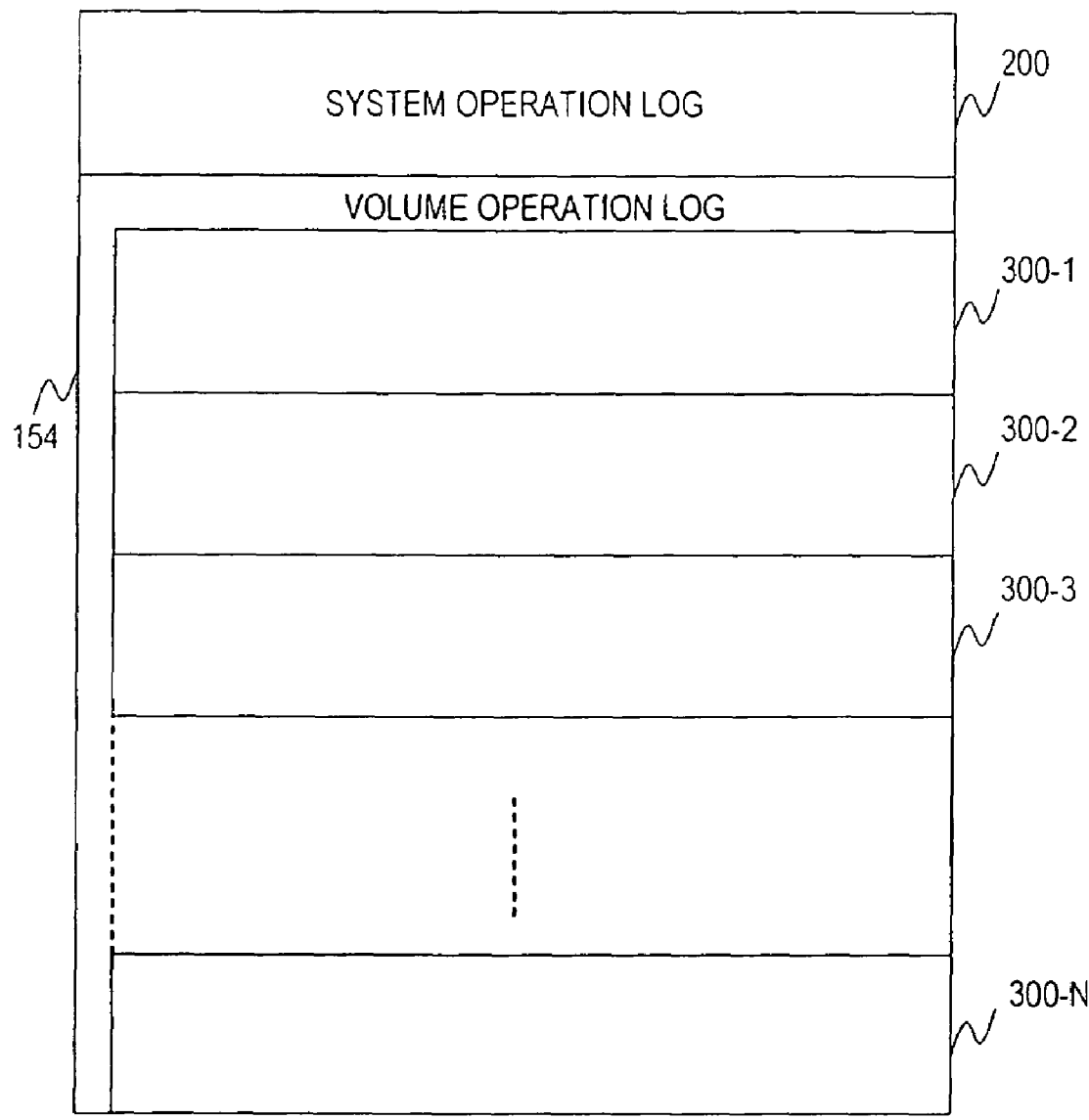
FIG. 3 shows an operation log area according to an embodiment of the present invention.

FIG. 3 shows an operation log area 154 according to an embodiment of the present invention. In this embodiment, the operation log area 154 includes two categories information, system operations and logical volume operations. Information relating to certain system operations and associated timestamps are saved to system operation log 200, while information relating to certain logical volume operations (including logical volume states, such as removal of an underlying HDD device) and associated timestamps are saved to a volume operation log 300.

In addition, each logical volume in storage system 1 has an associated volume operation log 300. Therefore, if there are N logical volumes in storage system 1, then N volume operation logs 300 exist. For example, in FIG. 3, operation log area 154 includes volume operation log 300-1, 300-2, . . . , and 300-N for the N logical volumes, and information relating to volume operations for a logical volume k is stored in the volume operation log 300-k, where $1 \leq k \leq N$. Storage manager 151 stores volume operation information with associated timestamps to volume operation log 300 corresponding to the logical volume.

Figure 4:
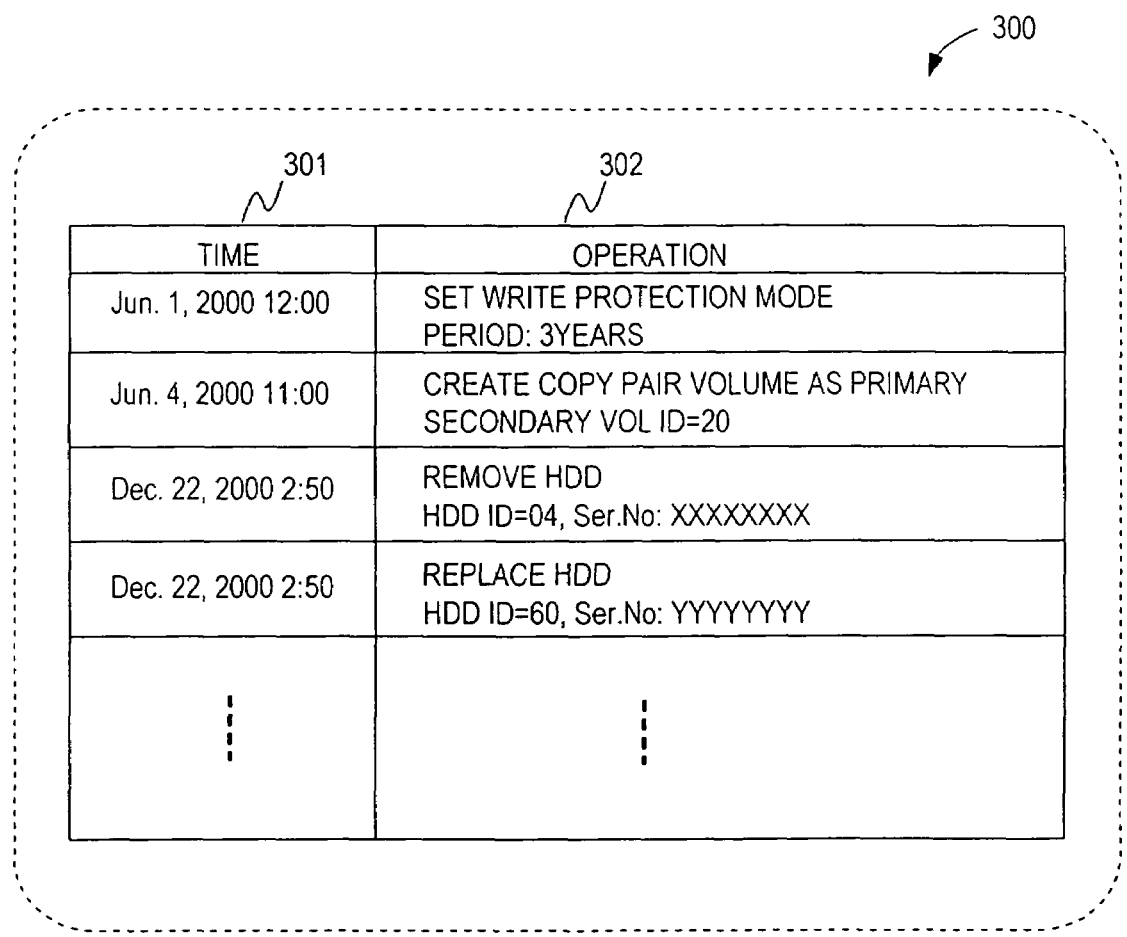
FIG. 4 shows a volume operation log according to an embodiment of the present invention.

FIG. 4 shows an example of the volume operation log 300 according to an embodiment of the present invention. Time 301 indicates the time a volume operation is requested or, alternatively, executed by storage system 1. For state change events of the logical volume, time 301 indicates the time of occurrence. Time 301 is a timestamp for the volume operation or event. Operation 302 is a brief description of the volume operation or state.

As volume operation log 300 is intended to provide a historical record of a logical volume to support its authenticity, volume operations and volume state information facilitating verification of the data should be saved in volume operation log 300. In an embodiment of the present invention, the storage manager 151 can store one or more of the following conditions in the appropriate volume operation log 300:

1. Any instruction, request, or command to set the write protection a logical volume (such as a change to a write protect attribute). The description of the operation includes the user specified retention period. However, in alternative embodiments, where the retention period is predefined, the retention period need not be recorded to the volume operation log 300.
2. Any instruction, request, or command to create a copy of the logical volume if the logical volume is write protected. The description of the operation stored in the volume operation log 300 can contain information indicating that the logical volume is a primary volume of a copy pair, and information identifying the paired, secondary volume, such as VOL ID. Also, a description of the operation can be stored in the volume operation log 300 associated with the secondary volume indicating that this logical volume is paired to the write protected volume.
3. Removal of one or more hard disk drives underlying a write protected logical volume. The description stored in volume operation log 300 can include information to identify the hard disk drive, such as HDD ID and HDD serial number. If the logical volume contains redundant information like redundant arrays of inexpensive disks (RAID) information, storage system 1 may replace the removed disk drives into spare disk drives when the environment monitor detects that one or more disk drives is removed. In this case, storage manager 1 records the information of the spare disk drives. In an alternative embodiment, removal of one or more hard disk drives underlying a logical volume, regardless of write protected status, can be logged in volume operation log 300.
4. Any event (including any instruction, request, or command) resulting in the change the attribute of the logical volume from write protected to offline.
5. Any instruction, request, or command to migrate from a logical volume of a secondary storage system 4 to a non-write protected logical volume in storage system 1. The description of the instruction, request, or command is recorded in the volume operation log 300 for the logical volume of storage system 1. In addition, if the secondary storage system 4 has its own volume operation log, the volume operation log information of the logical volume in the secondary storage system 4 is recorded to the volume operation log 300 for the logical volume of storage system 1. As an alternative embodiment, the instruction, request, or command to migrate is not recorded in volume operation log 300, since the logical volume is not write protected. This alternative reduces the memory used to implement logical volume logs for a storage system, but sacrifices traceability of the data of the logical volume of storage system 1 to its source.

Figure 5:
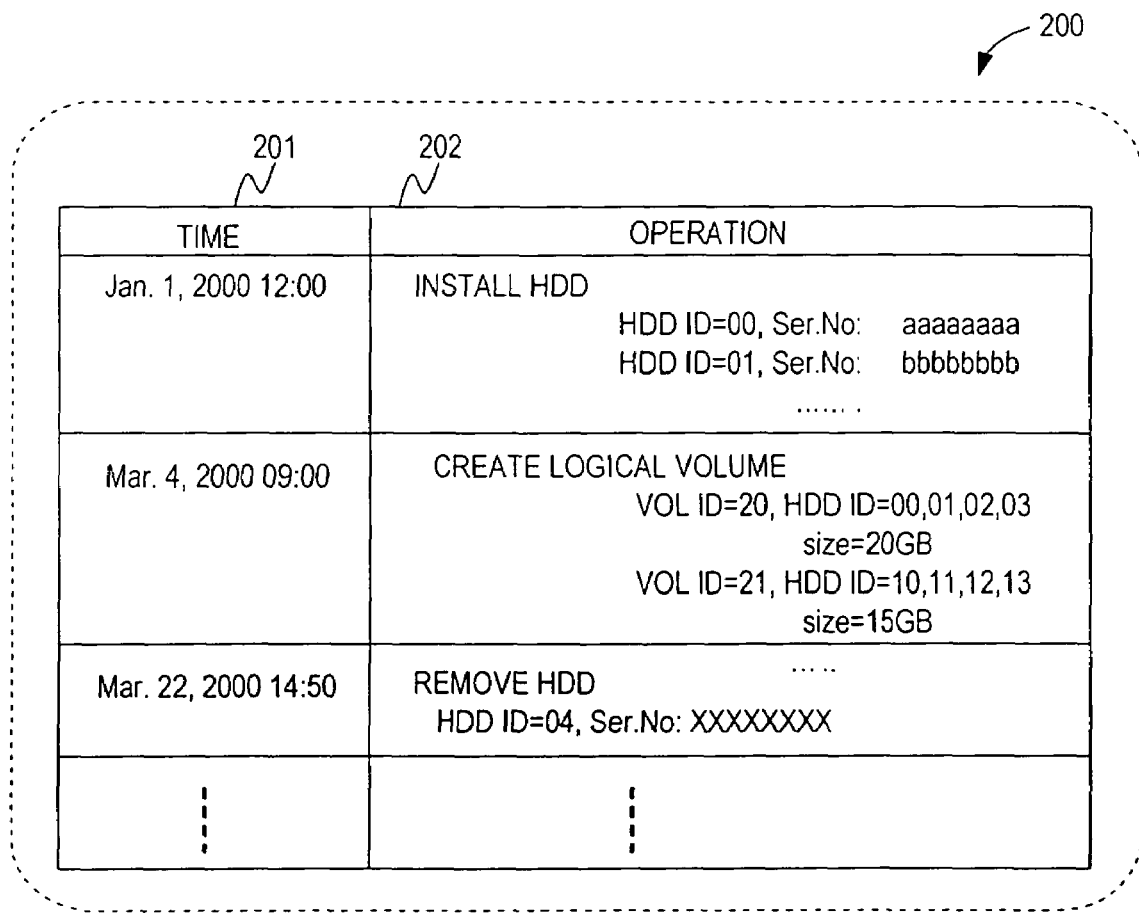
FIG. 5 shows a system operation log according to an embodiment of the present invention.

Information detailing hardware state or configuration is stored in system operation log 200 whenever an event results in a change to the state or configuration of the storage system 1 is changed. FIG. 5 shows an example of the system operation log 200 according to an embodiment of the invention. Time 201, a timestamp, indicates the time a state or configuration change occurs. Operation 202 is a brief description of the state or configuration change at the indicated time. In an embodiment of the present invention, the storage manager 151 can store one or more of the following conditions in the system operation log 200:

1. Installation of an additional disk drive in storage system 1. Information to be stored in system operation log 200 can include time of installation, serial number of disk drive, and location of installed disk drive.

2. Replacement of a failed disk drive with a spare disk drive. Information to be stored in system operation log 200 can include time of replacement, serial number of spare disk drive, and location of spare disk drive.

3. Removal of disk drive from storage system 1. Information to be stored in system operation log 200 can include time of removal, serial number of disk drive, and previous location of removed disk drive.

4. Creation of a logical volume. Information to be stored in system operation log 200 can include logical volume ID (VOL ID), HDD IDs, time of creation, and user requesting creation of logical volume.

Information recorded in the operation log area 154, including system operation log 200 and volume logical log 300, can be used to show that write protected volumes in storage system 1 have been not tampered and that these logical volumes remain in a write protected state. That is, storage system 1 records information relating to events which may provide an opportunity to alter the contents of the a write protected volume. Without the techniques disclosed herein, a user can circumvent safeguards to protect data found in conventional systems. For example, a user can create a copy of a logical volume to a secondary volume, alter the contents of the secondary volume, and then change the attribute of the secondary volume to a write protected state. As another example, a user familiar with the logical-to-physical mapping of the disks can remove hard disk drives from a conventional storage system, alter the contents of the hard disk drives in another device (considering the logical-to-physical mapping of the data), and re-install the hard disk drives into the original locations in the conventional storage system.

In the present embodiments, storage system 1 records susceptible operations or state changes, and operation log area 154 can be used to show no such operations or state changes occurred. Alternatively, operation log area 154 can be used by authorized users (such as auditors, compliance officers, inspectors, or system administrators) to investigate the circumstances surrounding any such susceptible operations or state changes. For example, an auditor can use the information stored in operation log area 154 to identify the user requesting a logical volume copy and then make an inquiry as to the identified user's use and purpose with the copied logical volume.

Figure 6:
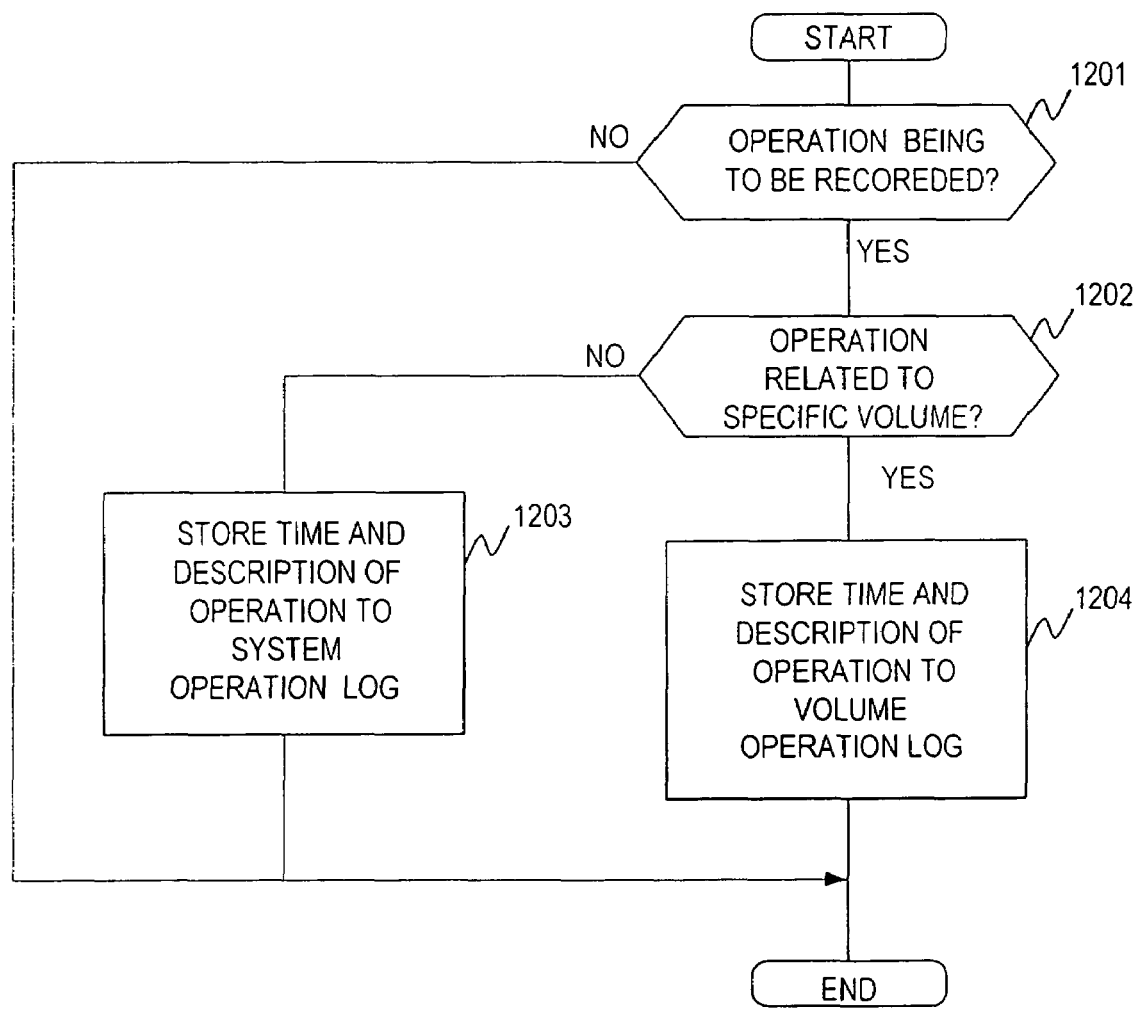
FIG. 6 is a flowchart that illustrates aspects of an exemplary procedure to log operations using the invention.

FIG. 6 is a flowchart that illustrates aspects of an exemplary procedure to log operations using the invention. In step 1201, storage manager 151 checks whether a management operation or state change information should be recorded to operation log area 154. That is, storage manager 151 verifies that the management operation or state change information is an event or operation required to be logged in either the system operation log 200 or the volume operation log 300. If not, the management operation or state change information is not recorded. Otherwise, in step 1202, storage manager 151 next determines if the management operation or state change information is related to the specific volume. If related to the specific volume, storage manager 151 stores the description of information with the current time (e.g., a timestamp) to volume operation log 300. If the management operation or state change information is not related to specific volume, storage manager 151 stores the description of information with a timestamp to system operation log 200. In an alternative embodiment, management operations, state change information, or a combination of management operations and state change information relating to logical volumes that are not write protected can record to volume operation log 300.

In addition to recording management information and timestamps to operation log area 154, the storage system 1 can also record certain I/O instructions from host computer 2 as I/O operation information 157. In one embodiment, I/O operation information 157 includes information useful in determining occurrences of long, sequential read accesses of data. I/O operation information can be stored in NVRAM 105.

FIG. 7 illustrates an exemplary embodiment of I/O operation information 157 according to the present invention. I/O operation information 157 is shown to be a table having N rows (for N logical volumes) and 6 columns. Each row contains sequential read information for a logical volume designated by VOL ID 401. Start time 402 indicates the time and date when a sequential read operation first occurred. Start LBA 403 is the first logical block address (LBA) where the data was read by the first sequential read command. Last time 404 indicates the time and date when the latest sequential read request was received, and last LBA 405 is the last LBA of the logical volume in which the data was read by the latest sequential read request. Flag 406 is information that is used by I/O processing program 152 to determine if a sequential read access should be processed or rejected.

Figure 8:
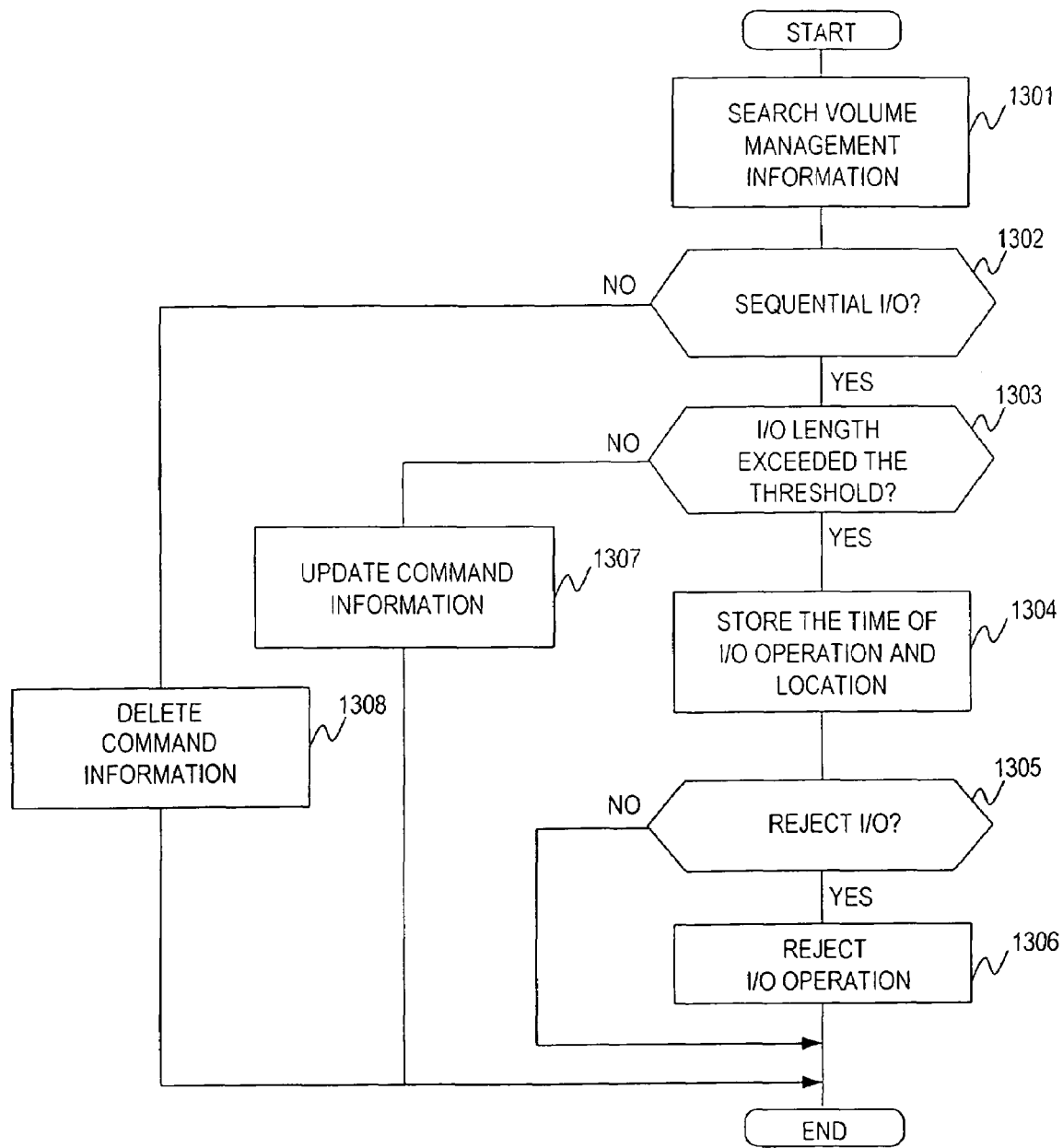
FIG. 8 is a flowchart that illustrates aspects of an exemplary procedure to detect sequential read operations using the invention.

FIG. 8 is a flowchart that illustrates aspects of an exemplary procedure to detect sequential read operations using the invention. This process is applied to logical volumes whose attribute is in a write protected state. However, in alternative embodiments, the process can also be applied to logical volumes not in a write protected state at the expense of increased memory usage.

In step 1301, when a read command is received by storage system 1 for a logical volume that is in the write protected state, I/O processing program 152 searches I/O operation information 157 for last LBA 405 of the logical volume. Next, in step 1302, I/O processing program 152 compares the last LBA 405 and the LBA information specified in the read command. If the LBA information specified in the read command is the next address of the last LBA 405, then I/O processing program 152 calculates a data length using start LBA 403 and the LBA information specified in the read command.

The calculated data length is compared to a predetermined value, or a "first threshold." The first threshold can be a value fixed in storage subsystem 1 (e.g., set at factory prior to delivery to end user). Alternatively, the first threshold may be a variable specified by an authorized user, such as an auditor, compliance officer, inspector, or system administrator, on console 3. By using start LBA 403 to calculate data length in step 1302, a read command that is divided and executed in multiple segments can be recognized as a sequential read command. Therefore, attempts to copy data in multiple stages, each below the first threshold, can be captured by I/O processing program 152 as a sequential read command.

If the data length does not exceed the first threshold, I/O processing program 152 determines that a sequential read is not being requested. Storage manager 151 deletes the read operation from an I/O address information in step 1308 and the requested read command is executed. If, on the other hand, the data length exceeds the first threshold, then I/O processing program 152 determines the read command is a sequential read command.

In the event the first threshold is exceed, then I/O processing program 152, in step 1303, determines if the data length exceeds a second predetermined value, or a "second threshold." The second threshold is equal to or larger than the first threshold value. It can also be a value fixed in the storage subsystem. Otherwise, the second threshold can be specified by an authorized user. If the data length exceeds the second threshold, information about the read command is passed to the storage manager 151 and the system proceeds to step 1304. If not, storage manager 151 in step 1307 updates I/O operation information 157 to reflect execution of the requested read command.

Storage manager 151, as shown in step 1304, records information relating to the read command to volume operation log 300. Storage manager 151 also updates the I/O operation information 157. The information recorded to the volume operation log 300 can include one or more of the following items: start time 402, start LBA 403, and data length.

As depicted in step 1305, storage manager 151 examines a reject flag 406 for the logical volume to determine whether the requested read operation is to be rejected or executed. Reject flag 406 can be set by an authorized user (for example, a system administrator, compliance officers, auditor, or inspector) via console 3. If reject flag 406 is identified as being in a reject state or "ON," storage manager 151 instructs I/O processing program 152 to reject the read operation and the requested read operation is rejected in step 1306. If the reject flag 406 is identified as not being in the reject state or "OFF," storage manager 151 instructs the I/O processing program 152 to execute the requested read instruction. In an alternative embodiment, a single reject flag 460 can be applied to all logical volumes in a storage system 1 in lieu a reject flag for each logical volume.

As shown above, I/O operation information 157 can be used to detect copying of whole contents of a write protected volume to another volume. This information could be used by an authorized user to trace the flow of preserved data to unprotected systems. Copy preserved data to an unprotected systems may be a concern of auditors, inspector, compliance officers, and the like. This situation could indicate that preserved data is being altered in an unprotected system to be later presented as genuine. For example, a corporation's compliance officer, by confirming the current use and status of each copy made, can confirm altered copies of data do not exist or at least are not being provided to a regulatory entity.

Furthermore, as illustrated in step 1306, storage system 1 can prohibit operations copying whole logical volumes all together.

In the present embodiment, since a single host computer 2 is connected to the storage system 1, the process compares the LBA in the latest read command with the LBA read by the previous read command in step 1302. In alternative embodiments with two or more host computers 2 connected to the storage system 1, I/O processing program 152 detects the host computer 2 that issues the read command and compares the last LBA information associated with the detected host computer 2 for the logical volume. Hence, I/O operation information 157 can also include information such as volume identification 401, start time 402, start LBA 403, last time 404, and last LBA 405 for each host computer 2.

Although storage system 1 is described as being a storage device capable of receiving block access commands over a SCSI or FibreChannel, the techniques described in this patent are also applicable to other types of storage devices, such as network attached storage (NAS) devices. For example, in a NAS device, to prevent host computers from copying the entire contents of a volume or file system, the storage system can be made to detect copy operations in which the all of the file or directory information is copied from a write protected volume or file system.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

What is claimed is:

1. A storage system comprising:
  a first interface to be coupled to a host computer sending I/O instruction;
  a second interface to be coupled to a console sending management instruction;
  a storage controller, coupled to the first interface, the second interface and a plurality of storage devices, that conducts an I/O instruction from the host computer and the management instruction from the console;
  a data storing area configured with at least one of the plurality of storage devices for storing data write accessible by the I/O instruction from the host computer via the first interface, an attribute of the data storing area being managed by the storage controller based on the management instruction; and
  a log storing area configured with at least one of the plurality of storage devices for storing log information associated with descriptions of the received management instructions which are target to the data storing area, the log storing area being different from the data storing area;
  wherein the management instruction is for managing attributes of the data storing area; and
  wherein the storage controller records the log information of the received management instruction targeted to data storing area in the log storing area and restricts the host computer from write access to the log storing area via the first interface.

2. The storage system of claim 1 wherein the plurality of storage devices are hard disk drives, the storage system having at least 10 hard disk drives, the storage system being a disk array unit.

3. The storage system of claim 1, wherein the data storing area is configured with at least one of a plurality of storage volumes defined in at least one of the plurality of storage devices, wherein the storage controller records log information of the received management instruction which is targeted to the at least one of the storage volumes if the at least one of the storage volumes are set write protect.

4. The storage system of claim 1, wherein the storage controller records log information of the I/O instruction.

5. The storage system of claim 4, wherein the log information of the management instruction is stored separately from the log information of the I/O instruction.

6. The storage system of claim 1, wherein the log information of the received management instruction includes a command to change an attribute of the data storing area.

7. The storage system of claim 1, wherein the data storing area is configured with at least one of a plurality of storage volumes defined in at least one of the plurality of storage devices, wherein the log information of the received management instruction is stored being associated with each of the storage volumes.

8. The storage system of claim 1, wherein one of the plurality of storage devices has the log storing area and the data storing area therein.

9. The storage system of claim 1, wherein the management instruction targeted to the data storing area includes change of an attribute for the data storing area.

10. The storage system of claim 9, wherein the attribute for the data storing area includes write protection attribute to restrict the host computer from write access to the data storing area.

* * * * *